United States Patent

Spies et al.

[11] Patent Number: 5,951,727
[45] Date of Patent: Sep. 14, 1999

[54] POLLEN FILTER

[75] Inventors: Manfred Spies, Biedenkopf; Heike Rademacher, Hamburg; Zygmut Kozaczka, Hamburg; Klaus Eberhard Papon, Hamburg, all of Germany

[73] Assignee: Beiersdorf AG, Hamburg, Germany

[21] Appl. No.: 08/965,894

[22] Filed: Nov. 7, 1997

[30] Foreign Application Priority Data

| Nov. 9, 1996 | [DE] | Germany | 196 46 363 |
| Jun. 3, 1997 | [DE] | Germany | 197 23 118 |
| Jul. 16, 1997 | [DE] | Germany | 197 30 433 |

[51] Int. Cl.$^6$ ................................. B01D 46/18
[52] U.S. Cl. .................. 55/385.1; 55/DIG. 35; 96/223; 96/226
[58] Field of Search .......... 55/385.1, DIG. 35; 96/223, 226; 128/206.12, 206.17, 141 R, 146.6

[56] References Cited

U.S. PATENT DOCUMENTS

| 3,757,495 | 9/1973 | Sievers | 96/FOR 175 |
| 3,918,448 | 11/1975 | McCosker | 128/146.6 |
| 4,038,979 | 8/1977 | McCosker | 128/141 R |
| 4,784,131 | 11/1988 | Schroeder | |
| 4,889,542 | 12/1989 | Hayes | 55/385.6 |
| 5,727,544 | 3/1998 | Miura | 128/201.13 |

FOREIGN PATENT DOCUMENTS

| 459893 | 5/1991 | European Pat. Off. |
| 286738A5 | 2/1991 | German Dem. Rep. |
| 3045723 | 7/1982 | Germany |
| 3045723A1 | 7/1982 | Germany |
| 3409967 | 9/1985 | Germany |
| 3409967A1 | 9/1985 | Germany |
| 3608872 | 10/1987 | Germany |
| 4300422 | 7/1993 | Germany |

*Primary Examiner*—Jay H. Woo
*Assistant Examiner*—Minh-Chau T. Pham
*Attorney, Agent, or Firm*—Sprung Kramer Schaefer & Briscoe

[57] ABSTRACT

An air-permeable filter material for use on doors, door frames, windows or window frames and a method of using the filter material to protect against the ingress of pollen and dirt particles in the environment. The filter material may be composed of fabric or film or a combination of film and fabric, the material having perforations of a diameter of 2–250 μm, and a fixing material for applying the filter material.

12 Claims, No Drawings

POLLEN FILTER

BACKGROUND OF THE INVENTION

1. Field of Invention

The invention relates to the use of a filter material which can be applied with an adhesive or fastening system to windows or doors, or to window frames or door frames, and which protects against the ingress of suspended particles in the air into living spaces.

Suspended particles in the environment, especially pollen, cause health problems to an ever-growing group of the population. Pollinosis is an allergic reaction which affects preferentially the mucosae, the eyes and the respiratory tract. The symptoms of allergic reactions have been adequately described in the medical literature (reddening and watering of the eyes, sneezing in conjunction with copious secretions of mucus, a general feeling of illness with weakness, exhaustion, reduced performance, shivering and a sensation of cold). In many cases, moreover, the allergic reactions are coupled with increased nervous excitability, which resembles neurasthetic states, and with increased sensitivity to any kind of sensory stimulation, especially of the optical, acoustic or vestibular variety. The severity of the symptoms can lead to a complete incapacity for work. Consequently, in the pollen season, which in central Europe lasts approximately from the end of March to the end of August/beginning of September, allergy sufferers try to protect themselves by staying in areas which are as far as possible closed.

2. Description of Related Art

Pollen filters for ventilation systems in the automotive industry are well known. These are relatively thick, non-transparent filter materials which have to be changed after a defined period of use. Also known, from the gardening sector, are hoods for insulating plants against external pollination, as described in DD 286738. DE 3409967 describes a pollen protection hood in the form of a head covering, in which the woven filter and viewing window are connected to one another by a touch-and-close closure, and vents in the brim of the hat ensure the required air circulation. DE 3045723 describes curtains, filters, nets and screens which can be attached by means of push buttons to windows or door frames and so ensure protection against environmental pollution, insects and flower pollen.

BRIEF SUMMARY OF THE INVENTION

In the case of applications in the window and door area, however, difficulties are caused by the sealing of the filter systems at the edge and by the lack of transparency. The object of the invention is to remedy this situation, and in particular to provide a pollen filter for living spaces, or a new possibility of application, which does not have the disadvantages of the prior art, at least not to the same extent.

This object has been achieved by using a transparent filter material with perforations of small diameter in combination with a fastening tape, as described in the claims.

DETAILED DESCRIPTION OF THE INVENTION

Filter Materials

Suitable filter materials are, in particular, all transparent, non-rustling films which can be made permeable to air, in particular by microperforation, especially PVC, polyurethane, polyethylene, polypropylene and corresponding copolymers. Polyester and PMMA films are likewise suitable because of their good transparency, but these films have the disadvantage that the movement of the films by a draught leads to disruptive noises. From a morphological standpoint, pollens differ in size, form, moisture content, weight and quantity, and in their content of specific antigens. The size of the pollen grains ranges from 2–3 $\mu$m up to 250 $\mu$m, and in the majority of allergenic plants is between 20 and 45 $\mu$m.

In view of these circumstances the size of the perforation which is made in the course of microperforation is advantageously within a range from 2 to 250 $\mu$m, preferably from 10 to 50 $\mu$m. With microperforations it is possible to make perforation sizes of 2–70 $\mu$m. In order to ensure optimum oxygen exchange a maximum perforation density should be chosen (up to 1.6 million pores/m$^2$ or more). Microperforation can be carried out by all current microperforation methods, which are described in detail in the literature (hot-needle technique, liquid or gas jet techniques, with ultrasound or high-frequency technology, with laser beam technology, or by means of electrostatic processes; cf. also W. Große, Kunstoffe Vol. 84, 1994/95).

Thin, fine-meshed fabrics are likewise suitable as filter materials for pollen and have the advantage that they can be cleaned by a washing operation. A disadvantage in this case, however, is the poorer transparency relative to films, which are completely transparent. Because of this, fabrics are preferably suitable for application by sticking to doors or windows in the inclined position, using a double-sided adhesive tape or a single-sided adhesive and single-sided fastening tape, in order to be able to fix a filter material cut to a trapeziform shape to the said doors or windows. Preferred materials for fine-meshed fabrics are polyester and polyamide. The size of the mesh is guided by the above-mentioned perforation sizes for suitable microperforated films.

The term fabric here includes a filter nonwoven, also secondly a filter felt, having permeability levels which correspond to the idea of "perforations having a diameter of 2–250 $\mu$". Suitable such materials are, for example, non-wovens from the company Royalin GmbH. With type G 39/110 S, based on polyester with acrylic binder, which corresponds to filter class EU 5, for instance, it is possible to filter out about 95%. of all particles having a size of $\geq$10 $\mu$m. These and similar products are likewise suitable as filter materials.

If application takes place by starting from a product consisting of two segments, as described in Examples 4 and 5, particularly good transparency can be attained when using shrink films for the air-impermeable segment.

Application

The fixing of the filter materials to doors and windows or to door frames and window frames takes place, in the case of films, preferably with double-sided adhesive tapes, which must possess sufficient adhesive force and a sufficient cushion of mass for the filter material to lie tight against the adhesive tape. In the case of fabrics, single-sided adhesive tapes with a touch-and-close facility can be used, in which case it is readily possible to change the filter material without having to change the fixing material as well.

With the aid of the fixing materials described, the filter materials described can be either over the whole area of doors or window frames, or as a trapeziform area on doors or windows which are in the inclined position, and to door frames or window frames. The method described for application to inclined windows is particularly suitable when areas require permanent ventilation and the filter materials are of only moderate transparency.

In accordance with the invention, it is also possible to equip only part of the area of a window but to seal off the other part, preferably by means of a clear film, so that the transparency of the overall system is not significantly affected.

In the text below the invention will be described with reference to exemplary embodiments without, however, wishing unnecessarily to restrict the invention.

EXAMPLE 1

A 60 μm thick glass-clear PVC film from the company Hoechst (Genotherm GE 15) is perforated by electrostatic microperforation to give a perforation diameter of 20 μm. The microperforated material is cut so that it can be fitted between window and window frame (900 mm×1600 mm). Tesafix 4902 in a width of 19 mm is stuck into the window frame (tesafix 4902 is a double-sided adhesive tape which firstly can be stuck securely into window frames and removed again as well, and which secondly fixes films securely). The microperforated film is subsequently stuck onto the adhesive tape. With regard to the bond strength of the window frame/adhesive tape/filter film assembly, it proves favourable if the window is kept closed for about two hours after application. The above-described pollen protection film can be used to prevent pollen having a size of a $\geq 20$ μm from entering the living space.

EXAMPLE 2

A vacuum-perforated film, which is transparent and consists of an LD/HD-PE blend, from the company Tredegar (Flexifilm S-6020025) is cut to the size of an internal window frame (900 mm×900 mm).

| Film properties: | |
| --- | --- |
| Perforation diameter: | 100 μm |
| Number of perforations: | 644 /cm² |
| Open area: | 7 % |
| Thickness before perforation: | 25 μm |
| Thickness after perforation: | 205 μm |
| Carrier weight: | 23 g/m² |

Tesafix 4902 in a width of 19 mm is stuck into the window frame, and the vacuum-perforated film is applied thereto. The above-described filter material ensures protection against pollen and dirt particles having a size of $\geq 100$ μm.

EXAMPLE 3

A partially transparent polyamide screen fabric from the company Klein+Wieler having a perforation diameter of 20 μm is cut to give a trapeziform area which can be used to cover the open part of an inclined window of dimensions 900 mm×1600 mm. Tesafix 4902 in a width of 19 mm is stuck onto the outer edge of the inside of the window and onto the inner edge of the inside of the window frame, and the fine-meshed fabric is fixed thereto. The filter material ensures protection against pollen having a size of a $\geq 20$ μm.

EXAMPLE 4

A 145 μm thick glass-clear PU film from the company Wolf Walsrode Type VDT 2201, 1300 mm×900 mm in size, is laid with the narrow side flush against a partially transparent polyamide fabric from the company Klein +Wieler (perforation diameter 20 μm) of 300 mm×900 mm in size, and the assembly is welded on one side with a film welding apparatus from the company Kopp Type SZ.

Tesafix 4902 in a width of 19 mm (tesafix 4902 is a double-sided adhesive tape which firstly can be stuck securely into window frames and which secondly fixes films and fabrics securely) is stuck into a window frame of 900 mm×1600 mm in size.

The welded material consisting of film and fabric is subsequently stuck onto the adhesive tape so that the piece of fabric is at the upper part of the window. In respect of the bond strength of the window frame/adhesive tape/filter film and fabric assembly it proves favourable if the window is kept closed for about 2 hours after application.

With the product constructed in this way it is possible to ensure permanent ventilation of living spaces, without significant impairment to the transparency of the window glass, without allowing the ingress of pollen having a size of a $\geq 20$ μm into the living space.

EXAMPLE 5

A 19 μm thick shrink film from the company DuPont Type Clysar 75 ABLF of 1300 mm×900 mm in size is stuck with the narrow side flush to a 300 mm×900 mm polyester nonwoven (filter class EU 5) Type G 39/110 S from the company Royalin GmbH using tesafix 4902 (tesafix 4902 is a double-sided adhesive tape which firstly can be stuck securely into window frames and which secondly fixes films and fabrics securely). Tesafix 4902 in a width of 19 mm is stuck into the internal joint in a window frame of 900 mm×1600 mm in size. The bonded material, consisting of a shrink film and polyester nonwoven, is subsequently stuck onto the adhesive tape so that the polyester nonwoven is at the upper part of the window. The film can be applied without creases using a conventional hot-air hairdryer. In respect of the bond strength of the window frame/adhesive tape/filter film and polyester nonwoven assembly it proves favourable if the window is kept closed for about 2 hours after application. With the product constructed in this way it is possible to ensure permanent ventilation of living spaces, with excellent transparency, without allowing the ingress of pollen having a size of a $\geq 10$ μm into the living space.

We claim:

1. Method of protecting doors and windows against the ingress of pollen or dirt particles which comprises applying filter material comprising fabric alone or a combination of fabric and film, having perforations of a diameter of 2–250 μm, to doors, door frames, windows or window frames with fixing material comprising single-sided adhesive tape with touch-and-close facility so that said filter material is removable and replaceable without changing said fixing material on said doors, door frames, windows or window frames.

2. Method according to claim 1, wherein said filter material is transparent or partially transparent.

3. Method according to claim 1, wherein said perforations are of a diameter of 10–50 μm.

4. Method according to claim 1, wherein said filter material is applied in rectangular form to doors, door frames, windows or window frames or in trapeziform to doors, door frames, windows or window frames, in an inclined position.

5. Method according to claim 1, wherein said film is a shrink film.

6. An air-permeable filter for use on doors, door frames, windows or window frames to protect against the ingress of pollen or dirt particles comprising a filter material comprising fabric alone or a combination of fabric and film, having perforations of a diameter of 2–250 µm, and a fixing material comprising single-sided adhesive tape with touch-and-close facility so that said filter material is removable and replaceable without changing said fixing material on said doors, door frames, windows or window frames.

7. Method of protecting doors and windows against the ingress of pollen or dirt particles which comprises applying filter material comprising fabric alone, film alone or a combination of film and fabric, having perforations of a diameter of 2–250 µm, to doors, door frames, windows or window frames with fixing material comprising double sided adhesive tape.

8. Method according to claim 7, wherein said material is transparent or partially transparent.

9. Method according to claim 7, wherein said perforations are of a diameter of 10–50 µm.

10. Method according to claim 7, wherein said filter material is applied in rectangular form to doors, door frames, windows or window frames, or in trapeziform to doors, door frames, windows or window frames in an inclined position.

11. Method according to claim 7, wherein said film is a shrink film.

12. An air-permeable filter for use on doors, door frames, windows or window frames to protect against the ingress of pollen or dirt particles comprising a filter material comprising fabric alone, film alone or a combination of film and fabric, having perforations of a diameter of 2–250 µm, and a fixing material comprising double sided adhesive tape.

* * * * *